United States Patent [19]

Gould

[11] Patent Number: 4,704,583
[45] Date of Patent: Nov. 3, 1987

[54] LIGHT AMPLIFIERS EMPLOYING COLLISIONS TO PRODUCE A POPULATION INVERSION

[76] Inventor: Gordon Gould, 1200 N. Nash Ave., Arlington, Va. 22209

[21] Appl. No.: 823,611

[22] Filed: Aug. 11, 1977

Related U.S. Application Data

[60] Division of Ser. No. 498,065, Aug. 16, 1974, Pat. No. 4,053,845, which is a continuation of Ser. No. 644,035, Mar. 6, 1967, abandoned, and Ser. No. 804,540, Apr. 6, 1959, abandoned, said Ser. No. 644,035, is a division of Ser. No. 804,540, Apr. 6, 1959, abandoned, and a continuation-in-part of Ser. No. 804,539, Apr. 6, 1959, abandoned.

[51] Int. Cl.[4] .......................... H01S 3/00; H01S 3/22; H01S 30/097
[52] U.S. Cl. ...................... 330/4.3; 372/34; 372/55; 372/85; 372/100
[58] Field of Search ............ 331/94.5 G, 94.5 P; 330/4.3; 372/55, 85

[56] References Cited

U.S. PATENT DOCUMENTS 2,929,922 3/1960 Schawlow et al. .................. 330/4.3

OTHER PUBLICATIONS

Fabrikant, "Trudy Vsesoiuznoe Eleckttotekhniiheskii Institut, 41, 254, pp. 273-274.
Headrick et al., "Collisions of the Second Kind etc...", 3/15/31, pp. 736-755, Physical Review, vol. 37.
Mitchell et al., "Resonance Radiation and Excited Atoms", 1934, pp. 57-89 and 154-255, MacMillan Co.
Schawlow et al., "Infrared and Optical Movers", 12/58, pp. 1940-1949, Physical Review, vol. 112.
Biberman, "V. A. Fabrikant", 5-6/68, pp. 798-799, Soviet Physics Uspekhi, vol. 10, #6.

Primary Examiner—Nelson Moskowitz
Attorney, Agent, or Firm—Lerner, David, Littenberg, Krumholz & Mentlik

[57] ABSTRACT

This application discloses light amplification apparatus in which population inversion is created in which energized particles collide with a lasing medium to create a population inversion. In the preferred embodiment the energized particles are atoms, ions, or molecules different than the lasing medium which are excited to a long-lived state above the ground state. Various materials usable in such light amplification apparatus are disclosed as well as means for passing light through an amplification region.

15 Claims, 6 Drawing Figures

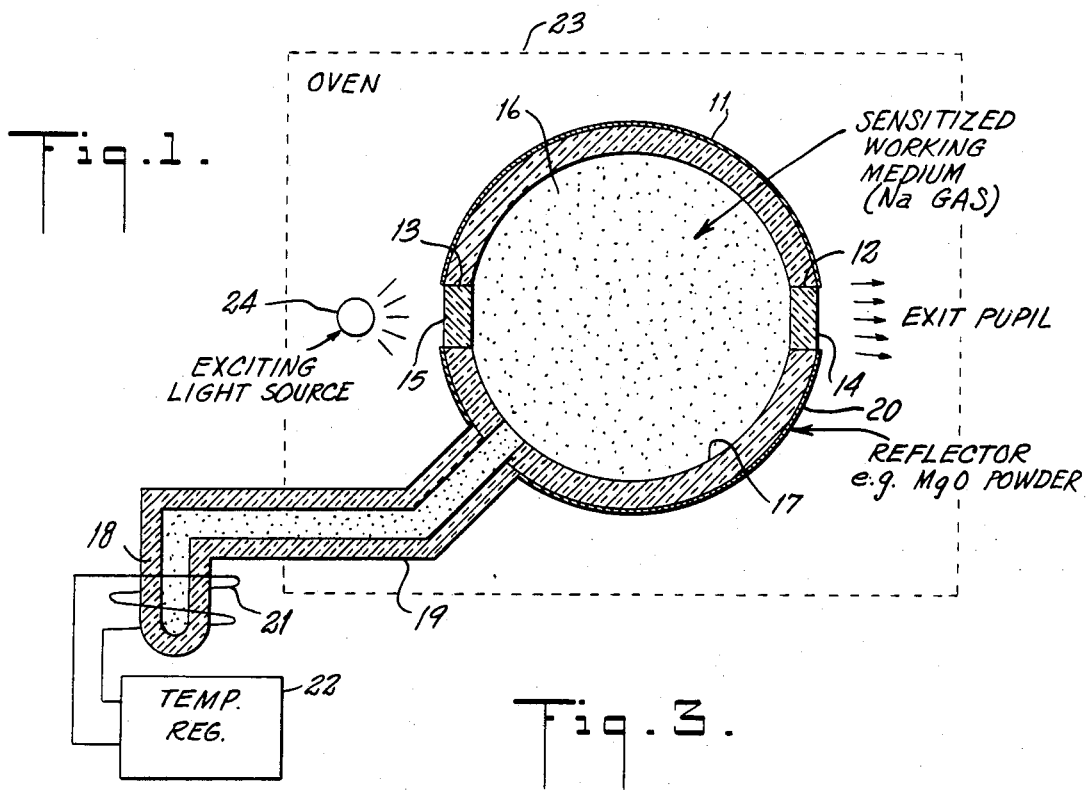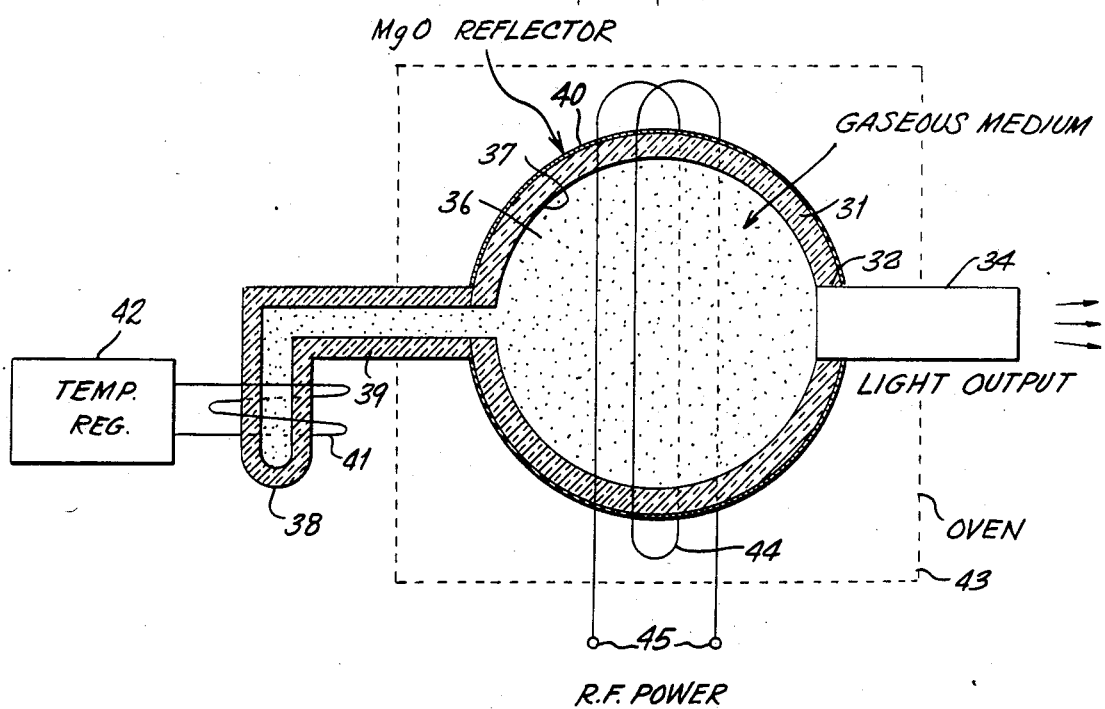

LIGHT AMPLIFIERS EMPLOYING COLLISIONS TO PRODUCE A POPULATION INVERSION

CROSS-REFERENCE TO RELATED APPLICATIONS

This is a divisional application of my co-pending application Ser. No. 498,065 which was filed on Aug. 16, 1974, and is now U.S. Pat. No. 4,053,845. That application was a continuation of both of my applications, Ser. No. 644,035 filed on Mar. 6, 1967 and Ser. No. 804,540 filed on Apr. 6, 1959, which were co-pending therewith and both are now abandoned. My continuation application Ser. No. 644,035 was co-pending with and (1) a divisional application of my application Ser. No. 804,540 filed on Apr. 6, 1959, now abandoned, and (2) a continuation-in-part of my application Ser. No. 804,539 filed Apr. 6, 1959, now abandoned.

This invention relates to light amplification apparatus, and particularly to such a light amplification apparatus in which a population inversion is created by collisions between particles.

A short explanation of the physical principles involved in light amplification will be helpful in explaining the nature of the invention. Additional teachings with regard to light amplification will be found in my U.S. Pat. No. 3,388,314, which is incorporated herein by reference as though fully set forth herein.

It is known that atoms, ions or molecules (hereinafter called molecules) ordinarily exist in so-called "stationary" states possessing a more or less well defined energy. While in such a state a molecule does not exhibit an oscillating electric or magnetic moment. However, since a molecule is made up of charged particles, it will be perturbed by any oscillating electric or magnetic field in which it may lie. When so perturbed, a molecule originally known to be definitely in stationary state "a" will possess a certain probability of being found in state "b" with different energy. When in such a "mixed" state, the molecule may exhibit an oscillating electric or magnetic moment (i.e., it may appear as a system of oscillating charges, or charges in changing orbits). A molecule will undergo a transition from state "a" to state "b" (i.e., have a large probability of being in state "b") if the induced electric or magnetic moment oscillates with almost the same frequency as the applied electric or magnetic field, and if the polarizations and phases of the oscillations correspond. The frequency of the oscillating moment is determined by the Einstein relationship:

$$\Delta E = h\nu_0$$

where
- $\nu_0$ = the oscillation frequency
- h = Planck's constant
- $\Delta E$ = the energy difference between the two molecular states.

The same equation $E = h\nu$ gives the energy of the photons associated with the electro-magnetic field. The photon density is proportional to the energy density of the field. During a transition, a photon or "quantum" electro-magnetic energy is emitted to or absorbed from the field, depending on whether the molecule is changing from a higher to lower energy state or vice-versa.

Even when there is no radiation energy density of the right frequency directly observable at the molecule, spontaneous transitions occur from higher to lower states with the emission of photons. These transitions are actually induced by random fluctuations in the electro-magnetic field of so-called "empty" space.

The photons emitted during an induced transition have the same phase and polarization as the inducing wave—i.e. they are "coherent" with it. A single atom may radiate a photon in any direction. However many atoms distributed over a finite volume and radiating coherently cooperate to generate a wave having the same propagation vector as the inducing wave, within the limits of a diffraction pattern. That is, they amplify the inducing wave. The radiation from induced emission has a spectral distribution similar to that of the inducing radiation and may be in a very "sharp" line.

Spontaneously emitted photons, because of the random nature of the zero-point fluctuations, have no definite phase or polarization. Because the zero-point fluctuations contain all frequencies, spontaneously emitted radiation has a finite bandwidth, characterized, at the least, by a Lorentzian line shape.

In thermal equilibrium, the populations of two states are related by the Boltzmann distribution factor:

$$\frac{N_{high}}{N_{low}} = e^{-[\frac{E_{high}-E_{low}}{KT}]}$$

Thus, in equilibrium the population of a higher energy state is less than that of a lower energy state. In particular, the population of a state separated from the lowest by an optical frequency is practically nil at ordinary temperatures. Induced transitions under these conditions necessarily absorb photons from the radiation field.

The foregoing principles can be utilized to devise apparatus for microwave amplification by stimulated emission of radiation which has been termed a MASER. If by some means the population of a higher energy state is made larger than that of a lower energy state, induced transitions must necessarily result in the emission of photons to the radiation field. Thus a molecule may emit spontaneously a photon which in turn may induce coherent emissions in neighboring molecules, adding to the total radiation energy. If the transition is at a microwave frequency, the system may be enclosed in a cavity resonant at the same frequency and the escape of the photons prevented. If the power loss from the cavity is less than the power emitted from the molecules, the system will oscillate with a frequency which fluctuates much less than the (Lorentz) bandwidth of the transition. The condition for MASER oscillation in a gas is that the excess population density $$N_h - N_e > \frac{h}{8\pi^2 p^2 \tau Q}$$

if the gas fills the cavity.
- $\tau = T_1 = T_2$ is the relaxation time or state lifetime.
- Q = the "quality factor" of the cavity.
- p is the oscillating electric or magnetic moment characterizing the transition.

If the condition for oscillation is not quite met but external power is coupled into the cavity, the "sensitized" or "pumped" molecules will add to or amplify the signal. Because power is lost through the output coupling, the condition for infinite gain, at optimum output, is $$N_h - N_c \geq \frac{h}{4\pi^2 p^2 \tau Q_{unloaded}}$$

This amplification adds very little random "noise" to the amplified signal. The minimum noise is determined by thermal fluctuations in the radiation field or by random spontaneous emission, whichever is larger.

Several methods have been proposed for maintaining an excess population in the higher of two molecular energy states of a gas filling a resonant MASER cavity. One form of MASER which has been proposed achieves "optical pumping" by unpolarized light.

The discussion of this form of "optical pumping" will be given in terms of rubidium (atoms) but would be similar for other cases. Light, characteristic of various spontaneous transitions in Rb, is generated in a discharge lamp and passed through a filter. The filter removes all frequencies except that component line which induces transitions from the F=1 hyperfine level of the ground electronic level to some particular higher electronic level. Spontaneous decays back to both hyperfine ground levels will result in a net pumping of Rb atoms from F=1 to F=2.

To maintain an excess population in F=2 over F=1, the optical pumping rate need only exceed the collision relaxation rate which may be made as small as 10/sec. Of course this minimum pumping rate would give a correspondingly small power output from the MASER.

In the light amplifier, on the other hand, the negligible thermal population of higher electronic states and the high rate of spontaneous emission from these states, make necessary a much higher pumping rate. In general, these effects preclude light amplifier operation between a higher state and a ground state. Usually, a transition between two higher electronic states must be utilized.

Like the MASER, the light amplifier will operate on the principle of induced transitions from a higher energy state to a lower energy state with smaller population. However, the techniques usable and possible are appropriate to the optical region of the electro-magnetic spectrum. This frequency range is defined for the present purpose by the limit of transparency of materials in the infrared and ultraviolet to be approximately:

$$\begin{cases} 10^{-2} \text{ cm} > \lambda > 10^{-5} \text{ cm} \\ 3 \times 10^{12} \text{ cycles/sec} < \nu < 3 \times 10^{15} \\ \quad \text{cycles/sec in practice.} \end{cases}$$

Another limitation which becomes serious in the far ultraviolet is the amount of power spontaneously emitted by the active atoms. This emitted power increases as $\nu^4$, and must be equaled or exceeded by the input power in order to have light amplification. At $\lambda = 1000$ Å an input power of the order of 1 kilowatt is required. Below this wavelength the required input power is too large to dissipate.

Likewise, the useful properties of the light amplifier are qualitatively different from the MASER and derive from the vastly shorter wavelength and higher frequency of the radiation involved.

The previous explanation has been given in terms of amplifiers and amplification, but it should be understood that if sufficient gain can be achieved, the light amplifying apparatus can be rendered self-oscillating. Thus a controlled light oscillator may be provided as well as an amplifier. The systems utilizing the apparatus as an oscillator will also be useful.

Another form of light amplifier according to the present invention, which will be described as a resonant form, has somewhat different characteristics and is useful for different and quite varied applications. It is a characteristic of a resonant light amplifier constructed according to the present invention that its output is in the form of a beam which is very nearly a plane wave if the input is a plane wave. That is, the divergence of the beam may be very small so the energy of the beam is substantially contained within a very small solid angle of the order of $10^{-8}$ steradians or less.

Apparatus according to the present invention provides the capability of amplifying light coherently, at least with respect to frequency and phase and in some cases also with respect to direction of propagation, and axis of polarization. Insofar as is known no apparatus with this capability has heretofore been produced.

A coherent infrared light molecular amplifier and generator has been proposed in U.S. Pat. No. 2851652 to Robert H. Dicke. This apparatus and methods proposed by Dicke differ in many respects from those of the present invention. In the Dicke device ammonia molecules are provided in a bounded volume wherein the higher of two molecular energy states is more highly populated than the lower; this is accomplished by physically separating, by electric fields, the molecules in the lower state from a beam of molecules before the beam is permitted to enter the bounded volume. Such activated molecules are capable of amplifying an electromagnetic wave within a particular frequency range.

The present invention, on the other hand, causes the atoms, ions or molecules of the working medium to be activated to produce the desired population excess in the higher energy level without actual physical separation. Furthermore, the desired population excess is produced within the bounded volume in which emission takes place in the present invention; whereas, in the Dicke apparatus the physical separation to produce the desired population distribution is accomplished outside the cavity after which the working medium is physically transported into the bounded volume in which stimulated emission takes place.

A simple very effective apparatus results from the different method and apparatus for activation utilized in the present invention.

In addition to the above objects and advantages of the present invention, it is an object of the present invention to provide a light amplifier wherein light is amplified by raising atoms, ions or molecules to a particular energy level and stimulating them by exposure to light having a frequency corresponding to the energy difference between that level and a lower energy state of the atoms, ions and molecules thus stimulating the atoms, ions or molecules to decay to the lower energy state with the emission of light energy coherent with the stimulating light, thereby amplifying it.

It is a still further object of the present invention to provide such a light amplifier wherein the atoms, ions or molecules are raised to a particular desired energy level (from which stimulated decay to a lower level is to be produced) by supplying electrical energy to produce a discharge within the confined space in which the atoms, ions or molecules to be excited are contained.

It is a still further object of the present invention to provide such a light amplifier wherein the atoms, ions or molecules are raised to a particular desired energy level (from which stimulated decay to a lower level is to be produced) by utilizing collisions of the second kind with atoms, ions or molecules of a different element or elements from that to be stimulated to produce the emission of light.

Other objects and advantages of this invention will be apparent from a consideration of the following description in conjunction with the appended drawings, in which:

FIG. 1 is a partially schematic illustration in cross-section of a nonresonant light amplifier designed to be excited by an external source of light radiation.

FIG. 3 is a partially schematic illustration in cross-section of a nonresonant light amplifier designed to be excited by an electrical discharge within the amplifier cavity.

NONRESONANT LIGHT AMPLIFIER

Figure 2:
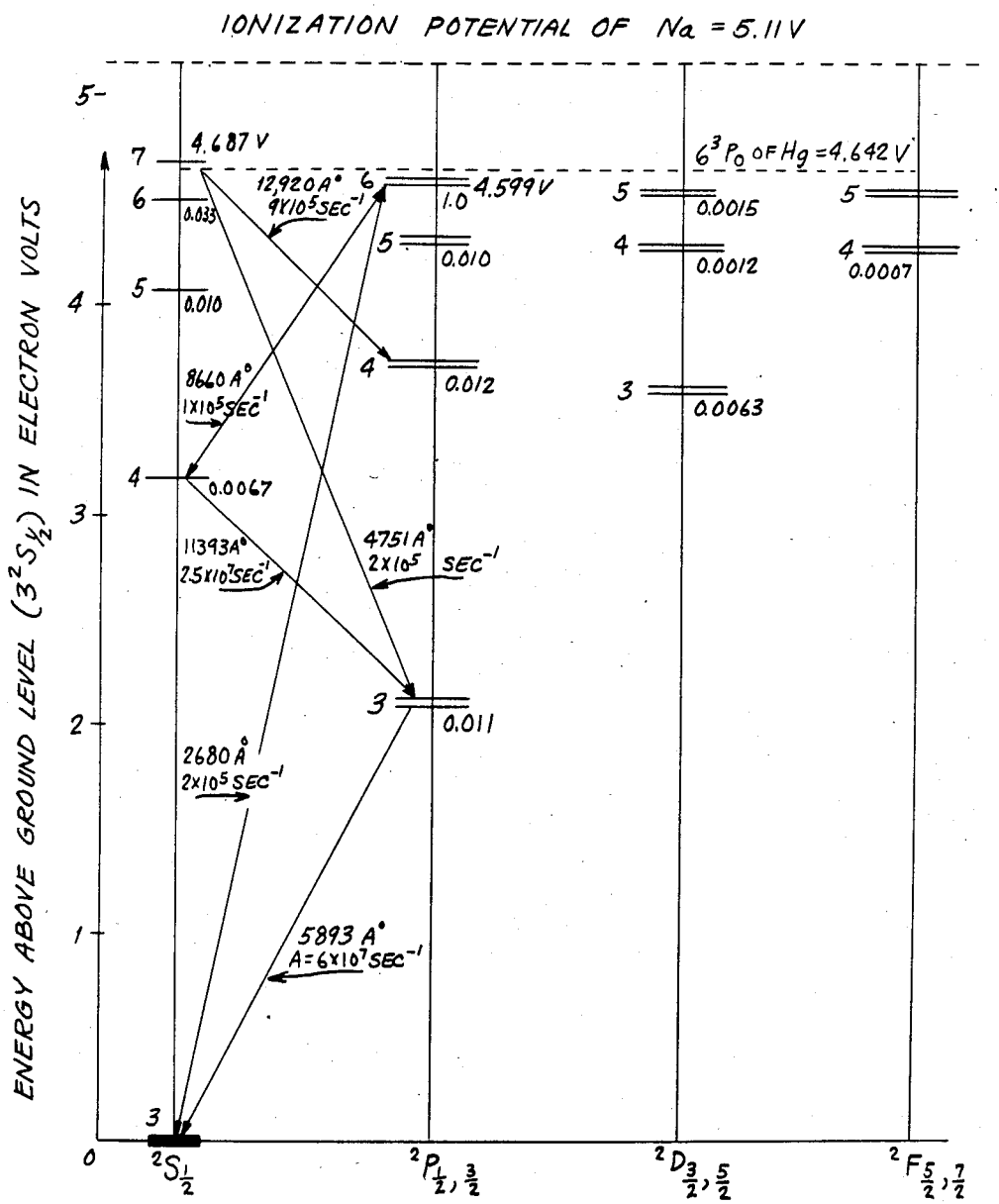
FIG. 2 is a Grotrian diagram of energy levels of sodium presented to aid in the explanation of light amplifying apparatus according to the present invention.

Referring to FIG. 1, there is shown at 11 a spherical cavity 11 forming a principal part of a nonresonant light amplifier. Although a spherical cavity has an optimum volume to surface ratio, the cavity need not be of this shape but could be cylindrical, rectilinear, or of other shape if desired.

The cavity 11 is provided with apertures 12 and 13 for the output and the exciting light input respectively for the cavity. Suitable windows 14 and 15 are provided to cover the apertures 12 and 13 and should be made of a material such as glass or the like, having a high transmission coefficient for the frequency of light involved.

The interior 16 of the cavity 11 is filled with a sensitized working medium, the nature and function of which will be hereinafter explained in more detail.

The wall 17 of the cavity 11 is rendered reflective as by a reflective coating 20. This surface may either be a specular reflector such as polished metal, or a diffuse reflector. For light in the visible region the highest reflectivity is achieved with a diffuse reflector such as magnesium oxide powder, and such a reflective surface would generally be preferred for the reflecting coating 20.

A gaseous atmosphere for the cavity interior 16 may be supplied from a reservoir 18 connected to the cavity by a conduit 19.

A heating coil 21 controlled by a temperature regulator 22 may be utilized to maintain the vapor in the interior of the cavity at the desired pressure. A temperature control oven 23 may be provided surrounding the cavity 11 to maintain the cavity at a temperature higher than that of the reservoir 18 thus preventing condensation in the cavity 11 and assuring control of pressure by means of a temperature regulator 22 regardless of changes in ambient temperature of the cavity.

Light is directed from an exciting light source 24 through the window 15 to the interior of the cavity 11. In a typical case, the light source 24 will comprise a gas discharge lamp having a gaseous atmosphere similar in composition to that of the atmosphere in the interior 16 of the cavity 11.

Although solid or liquid fluorescent material may be advantageous in certain applications rather than a gaseous medium within the cavity 11 in FIG. 1, transition processes in gases are more completely understood and accordingly the explanation of the invention will be primarily directed to this more readily understood form.

Operation of Nonresonant Light Amplifier

The operation of the light amplifier of FIG. 1 will first be explained with reference to a relatively simple form of excitation, that is, excitation by resonance radiation. It should be understood that other forms of excitation which will later be explained may in many cases be preferable to the simpler type of excitation by resonance radiation.

A desirable medium for this form of excitation is sodium vapor and for the purpose of this explanation, it will be assumed that the interior 16 of the cavity is filled with sodium vapor and that the exciting light source 24 is a sodium vapor lamp.

FIG. 2 is a diagram of some of the higher electronic levels of sodium. The hyperfine structures of these electronic levels are now shown.

The free-space wavelengths (in Angstroms) of the electro-magnetic radiation emitted during transitions between certain pairs of levels are given on the diagram of FIG. 2. The measured or estimated spontaneous emission rates for these transitions are also indicated. Electric dipole radiation selection rules permit transitions only between levels in adjacent columns of the diagram. Thus no transitions occur between levels with the same letter designation (same orbital angular momentum). Atoms in the ground level ($3^2S_{\frac{1}{2}}$) can be excited by resonance radiation from a sodium lamp only to the various P-levels. [However, all states may be excited by collisions with energetic electrons in a discharge or by collisions with other excited atoms (collisions of the second kind).]

It is desired to achieve a higher population in some higher level than in a lower level, to which transitions may be induced by the presence of light energy of suitable frequency. If it is assumed that only the $6^2P$ levels are excited directly from the ground level, light exciting other levels could be removed by an appropriate optical filter. Then by spontaneous emission various lower levels will become populated to some extent. The populations in dynamic equilibrium may be calculated from the spontaneous decay rates.

If the $6^2P$ levels are assumed to have a unit population, the computed populations of the other lower levels are shown in the diagram. It may be noted that the population of the $4^2S_{\frac{1}{2}}$ level is only 0.0067 of the $6^2P$ levels population and hence transitions generating the 8660 Å infrared line may be expected in a suitable enclosure.

From the diagram of FIG. 2 and the foregoing explanation, it will be seen that when the medium in the cavity 11 is excited by the light from the light source 24, a condition is produced where the population of a higher energy level ($6^2P$) is much higher than the population of a lower energy level ($4^2S_{\frac{1}{2}}$) so that the presence of light of the frequency represented by the difference between these two energy levels (wavelength 8660 Angstroms) will stimulate decay from the higher energy level to the lower energy level with the emission of more light of this same frequency.

Accordingly, when the pumping rate due to excitation from the source 24 is sufficiently great to maintain a large population difference between these two levels in favor of the higher level, and when losses in the cavity are reduced to a sufficiently low level as by maximizing the reflectivity of the surface 20, conditions for sustained oscillation will be met and the apparatus of FIG. 2 will operate as a nonresonant light oscillator.

Obviously, if the conditions for oscillations are approached but are not met, light of the appropriate frequency (8660 Angstroms) introduced into the cavity will be amplified by the stimulated emission of radiations and the output of the cavity at that frequency will be greater than the input thus providing amplification, but self-sustained oscillation will not occur.

The nonresonant light amplifier of FIG. 1 is schematically shown with a relatively small window for the introduction of light excitation; in practice, it will generally be desirable to utilize a substantial portion of the surface of the cavity as a window for light excitation. It will be recognized that increasing window area cuts down on the available surface for reflection. The effective reflection coefficient may be kept relatively high by arranging the reflective portions of the cavity on opposite portions of the surface of the amplifier enclosure.

If the window area desired for light excitation is a substantial portion of the total area of the cavity, it may be preferred to make the amplifier in another form, such as cylindrical, for example. This form may be particularly desirable as the curved peripheral surface of the cylinder may be made transparent for the introcution of light excitation while the ends of the cylinder may be rendered diffusely reflective. With this arrangement a large amount of light power may conveniently be transmitted into the cavity. Although there may be some reduction of average effective reflection coefficient, this is offset by other considerations.

If the cylindrical nonresonant amplifier described above is made in elongated form, only light within a narrow angular range of direction of propagation will be amplified and thus the noise due to spontaneous emission will be reduced, yielding a narrower output bandwidth. The output of an elongated cylindrical nonresonant amplifier may largely be restricted to an angle on the order of approximately 6°; this is much more convenient and may be directed more efficiently than the diffuse output as from a spherical amplifier or oscillator.

Tendency toward resonance in the elongated cylindrical nonresonant light amplifier will be avoided by the fact that light paths of many different lengths will exist between the reflectors; if desired, the reflectors may be shaped to increase the diversity of optical path lengths between reflectors.

Various elements other than sodium may be utilized in the construction of such a nonresonant amplifier, particularly those elements in group 1 of group 3. The characteristics of sodium, however, are generally more favorable than those of other elements.

A slightly more complex mode of operation has definite advantages over the relatively simple resonance radiation excitation described above. This mode of operation utilizes enhancement of intensity by collisions of the second kind to enhance the intensity of a particular spectral line from the lamp.

Considerable study has been made of the phenomenon of "sensitized fluorescence". Atoms of one kind, excited to a particular electronic level, may, on collision with atoms of a second kind, transfer their excitation energy. It has been shown experimentally and theoretically that the transfer process is most probable if two conditions are fulfilled:

(a) The smaller the energy difference between the levels of interest in the two kinds of atoms, the greater is the collision cross-section for the exchange.

(b) The total electronic angular momentum of the two atoms remains the same before and after the collision (Wigner partial selection rule).

In connection with rule (a), the energy difference must be converted to or from kinetic energy of the atoms. If the energy difference is less than "thermal energy" ($<K \approx 0.03$ ev) and if rule (b) is obeyed, the cross-section may be more than 100 times the "kinetic theory" cross-section. In particular, collisions of the second kind have been observed between metastable Hg ($6^3P_O$) atoms and sodium atoms in a mixed gas. It will be observed from the diagram of FIG. 2 that the Hg ($6^3P_O$) level falls between the Na (7S) and Na (6P) levels and is $<0.045$ ev from either. It has been observed that the visible Na (7S→3P) 4751 Å line became as intense as the Na (3P→3S) 5893 Å line under certain conditions, showing that the bulk of the energy was transferred to the Na (7S) level. The intensity enhancement will be about 20 times. It may be expected that transitions from the $6P_{\frac{1}{2}}$ level will be similarly enhanced.

The proper mixture of Hg in Na amalgam to obtain the necessary pressure of both Na ($\sim 10^{-4}$ mm Hg) and Hg ($\sim 1.0$ mm Hg) at operating temperature can be obtained from published data or approximately from Raoult's law.

From the foregoing explanation, it will be seen that by utilization of collisions of the second kind with a different kind of atom, the efficiency of the operation by which a greater population of a higher energy level is produced by optical pumping may be substantially increased with a resulting increase in efficiency of operation of the light amplifying device.

Nonresonant Light Amplifier with Internal Discharge

FIG. 3 shows a modification of the nonresonant light amplifier in which the gaseous medium within the cavity is excited directly by application of radio frequency energy rather than being excited by a light source as in FIG. 1 (low frequency energy or a direct current discharge could be used instead where desired).

A cavity 31 is provided having an opening 32 for the transfer of light output to the exterior of the cavity. A rod of transparent material shown at 34 may be utilized to transmit the light output from the apparatus, or alternatively, windows may be used as illustrated in FIG. 1.

The interior 36 of the cavity is preferably filled with a gaseous medium such as a mixture of mercury and sodium vapors as previously described. The wall 37 of cavity 31 is provided with a reflecting surface 40 such as magnesium oxide.

A reservoir 38 is connected by a conduit 39 to the intereior 36 of the cavity 31 in order to provide a gaseous atmosphere of the desired composition and pressure within the cavity 31. A heater 41 is provided for the reservoir 38 and is controlled by a temperature regulator 42 thus providing control of the pressure of the vapors within the cavity. Excessive fluctuation of pressure within the cavity 31 and condensation within the cavity 31 is prevented by maintaining the cavity 31 in a temperature controlled over 43.

Energy is supplied to excite the atoms within the cavity 31 by a coil 44 surrounding the cavity and supplied with high frequency excitation which may be of a frequency of approximately 100 megacycles for example.

Thus in the device of FIG. 3 excitation of atoms within cavity 31 is by a radio frequency energy induced discharge rather than by light excitation as in the apparatus of FIG. 1. In other respects the operation of the apparatus of FIG. 3 is substantially similar to that of FIG. 1.

Obviously the discharge within the cavity 31 may be produced in other manners such as by a direct current or low frequency discharge between electrodes within the cavity or by capacitively coupling high frequency electrical energy into the cavity rather than using the inductive coupling illustrated in FIG. 3.

The advantage of producing a discharge within the cavity rather than depending upon absorption of energy from a light source is readily understandable when it is realized that only approximately 20% or less of the light energy directed into the cavity is absorbed to produce useful pumping action. Furthermore, only a limited amount of "pumping" light can be introduced through a small hole. As the hole is made larger, the loss of light from the cavity becomes substantial. Where the discharge is produced within the cavity to excite the atoms, substantially all of the energy introduced into the cavity is absorbed in the working medium and a large fraction converted to useful output. If an internal discharge is used to excite the atoms, a large amount of "pumping" power may be coupled into the cavity.

Resonant Light Amplifier with Internal Discharge

Figure 4:
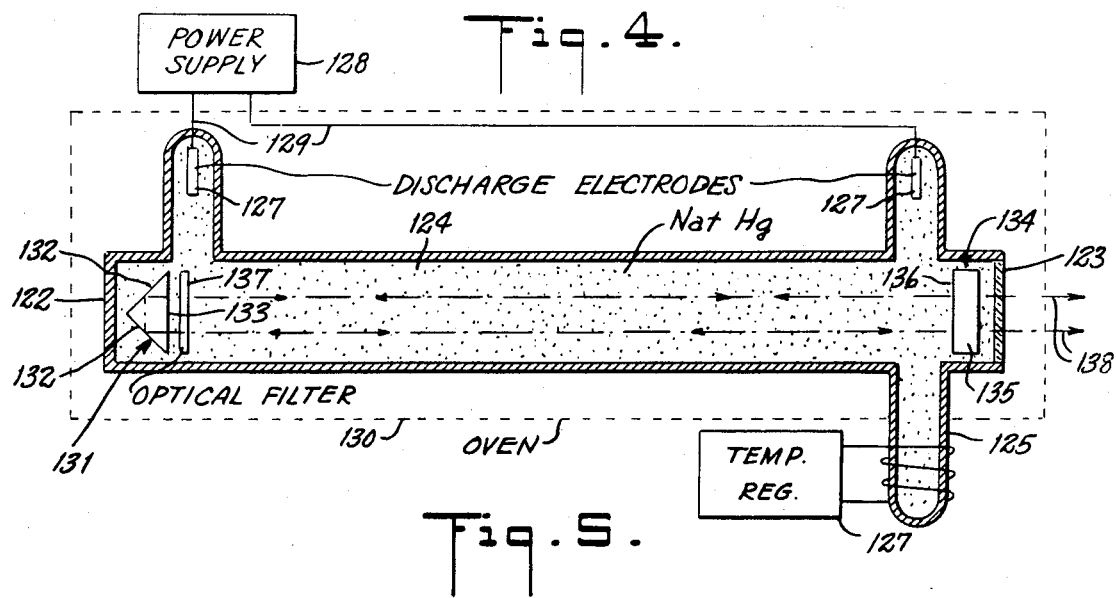
FIG. 4 is a partially schematic illustration in cross-section of a resonant light amplifier designed to be excited by a discharge within the resonant cavity.

The technique of exciting the atoms within the cavity may be applied to resonant light amplifiers as disclosed in my U.S. Pat. No. 3,388,314 (the entire patent being incorporated herein by reference) as illustrated in FIG. 4 herein. An elongated cavity 121 is provided having enclosed ends 122 and 123. Desirably at least one of the ends such as 123 is transparent to light of the frequency for which the amplifier is designed. In the case of the cavity 121 the side walls need not be transparent as in previously described cavities because there is no necessity for introducing light energy through the walls, as different means of excitation are used.

The interior 124 of the cavity 121 is provided with a gaseous atmosphere which may be supplied from a reservoir 125 heated by a heating coil 126 controlled by a temperature regulator 127. As previously described in the explanation of other forms of the apparatus, the elements 125, 126 and 127 in conjunction with a temperature control oven 130 surrounding the cavity 121 assure that the pressure of the medium within the cavity is maintained at the proper value.

Preferably the interior 124 of the cavity 121 is filled with a gaseous atmosphere comprising a mixture of sodium and mercury, or with some other mixture of elements by means of which the efficiency of exciting the working atoms to a desired energy level is enhanced by reason of collisions of the second kind. The general theory by which more desirable population distribution among the energy levels of one element is produced by collisions of the second kind with another element has previously been explained and will not be repeated here. The optical system of the device of FIG. 4 is similar to those previously described in my U.S. Pat. No. 3,388,314 in that it comprises two prisms 131 and 134 having 90° angled faces 132 and 135, respectively, and front faces 133 and 136. As explained therein, the front faces 133 and 136 are preferably provided with a low-reflection coating so that substantially all of the reflection is by internal reflection from the faces 132 and 135.

At least one of the faces 135 may be provided with a coating of a medium having an index of refraction intermediate between that of the prism 134 and the atmosphere in which it resides thus preventing total reflection at the face 135 and allowing transmission of light generated within the cavity 121 through the prism 134. It may be noted at this point that light passing through the prism 134 may be divided into several beams by reflection and refraction. In some cases this may be desirable, but in the event that it is desired to direct substantially all of the output beam in one direction, additional prisms can be provided for combining the various output beams by reflection or refraction to be directed substantially in the same direction.

An optical filter 137 may be included in the light path between the prisms 131 and 134 for the purpose of discriminating against light of a frequency other than that selected for the operation of the light amplifier. Particularly when such amplifier is operated as an oscillator, there may be an atomic transition of higher probability than that generating the desired light frequency. Such a transition would generate an oscillation at a lower input power than required for the desired oscillation. Such parasitic oscillations must be suppressed. Generally, oscillation in several modes simultaneously will not occur, except as transients, and would in any case be undesirable. Accordingly, it may be desired to place an optical filter such as 137 within the cavity 121, thus reducing the gain for all except the desired frequency of light below the point required for sustained oscillation.

It will be noted that in the apparatus of FIG. 4, no separate gas discharge lamp is provided for light excitation of the medium within a cavity. Instead a discharge is excited directly within the cavity 121 by means of electrodes 127 connected to a power supply 128 through leads 129.

Electrodes 127 in FIG. 4 are arranged inside the cavity 121 and may be energized to provide either a direct current or low frequency discharge. It is not necessary, however, that the electrodes be within the cavity to produce a discharge within the cavity. For example, electrodes outside the cavity formed of aluminum foil or the like may be utilized to induce an R.F. electric discharge in the cavity 121.

As previously explained, producing the discharge within the cavity provides the immediate advantage of increased energy transfer into the medium within the cavity. Virtually complete transfer of energy into the medium can be accomplished by this means whereas excitation by a light source is limited to approximately 20% absorption of the light power introduced into the cavity. Other advantages of excitation by discharge within the cavity also arise.

The higher S-levels of sodium cannot be excited by resonance radiation since radiative transitions between states of the same orbital angular momentum are forbidden by the electric dipole selection rule. However, they can be excited by collisions of the second kind in a discharge within the cavity. In the case of excitation of Na ($7^2S_{\frac{1}{2}}$) by collisions with Hg ($6^3P_O$) metastables, the Wigner partial selection rule relating to collisions of the second kind is satisfied and the collision cross-section may be expected to be about equal to that for excitation to the $6^2P_{\frac{1}{2}}$ Na level. The enhancement of population should be at least 100 times that in a sodium-argon discharge. One may expect to exceed the condition for oscillation in this case by a factor of 20 (for a tube 1 cm. diameter and 100 cm. length).

It can be seen from the diagram in FIG. 2 that, in addition to light amplifier oscillation via the 12,920 Å (7S→4P) transition, there is the possibility of light amplifier oscillation in the visible 4751 Å (7S→3P) transition in sodium. Although the Einstein "B" coefficient is larger for the former than for the latter transition, the (7S→3P) or any other particular transition can be favored by inserting filters to absorb all other wavelengths or by using multiple layer reflectors (which reflect only a narrow band of wavelengths). Thus only for the selected transition will the losses be small enough to permit the buildup of oscillation.

The pressure of sodium, and hence the operating temperature of the light amplifier tube, may be smaller since the density of Na atoms need only be large enough to ensure an adequate number of collisions/sec with metastable Hg atoms ($P_{Na} \approx 10^{-4}$ mm Hg) rather than enough to absorb the (6P←3S) resonance radiation.

This lower pressure can be arrived at as follows. It is known that under the usual conditions in a plasma the populations of metastable states are in thermal equilibrium at the electron temperature (of the order of 5000° C. for a Na-Hg discharge). Hence, the population of Hg ($6^3P_O$) metastables will be $\sim 10^{-4}$ of Hg ($6^1S_O$), the ground level, in a discharge of a few amperes. In a total pressure of 10 mm Hg of Hg, the metastable partial pressure would be $10^{-3}$ of Hg or a density, $N \approx 10^{13}$/cm$^3$.

The rate at which a sodium atom is excited to the 7S or 6P levels must correspond roughly with rates of quenching by collisions of the second kind in the case of N$_2$ and other such gases. For a partial pressure of Hg ($6^3P_O$), $P \approx 10^{-3}$ mm Hg, this rate of Na excitation would be $\gamma_{Na} \gtrsim 10^5$/sec. For a sodium pressure, $P \approx 10^{-4}$ mm Hg or $N_{Na} \approx 10^{12}$/cm$^3$, the total excitation rate $\approx 10^{17}$/cm$^3$ sec. For a light amplifier tube of volume 100 cm$^3$, this gives $10^{19}$ excitations/sec, or about 30 times the calculated necessary rate. If this power is substantially used to generate coherent photons by light amplifier action, a beam power of P=hν(dn/dt)≅2 watts will be produced.

Conversely the rate at which Hg metastables are attacked by Na atoms will be $\sim 10^4$ sec for a metastable lifetime, $\tau \approx 10^{-4}$ sec. This is at least 100 times shorter than the diffusion time to the walls and hence there will be practically no useless loss of metastables via this mechanism. Thus the efficiency of conversion will be relatively high (of the order of 10 percent of input power). The discharge current must, of course, be sufficient to keep up the equilibrium population of metastables. A discharge power, P=3 amps×0.3 volts/cm×100 cm=100 watts should normally be adequate.

Other Atomic Levels Excitable in a Discharge

In addition to the excitation of the Na (6P and 7S) levels by collisions of the second kind with Hg ($6^3P_O$) metastables in a discharge within the light amplifier tube, a number of other energy levels are prospectively suitable for excitation in a discharge. These other levels could not normally be expected to be excited by radiation falling on the tube from outside, either because radiation-induced transitions from the ground level are forbidden, or because the exciting radiation falls too far in the ultraviolet to pass through even the most transmissive medium such as a quartz tube wall.

A list of metastable levels which may be used to excite levels of nearly the same energy in other atoms by collisions of the second kind is given in Table I. These levels are long-lived because the electric dipole selection rules prohibit decay via this rapid radiative process to any lower level. Metastable levels are listed only for atoms which normally form a monotomic gas (uncombined in molecules) though others could possibly be utilized. Table I is not complete but contains levels most likely to be of practical use. The alkaline earth elements and Zn, Cd are not easily vaporized.

The processes listed below are not analyzed in great detail, but are listed as likely to be useful in particular cases or applications where particular frequencies or other characteristics are desired.

TABLE I

| ELEMENT | META-STABLE LEVELS | ENERGY ABOVE GROUND | IONIZATION POTENTIAL |
|---|---|---|---|
| Sn | | 2 v | 7.3 v |
| Pb | | 4 | 7.4 |
| Be,Mg,Ca,Sr,(Ba) | $n^3P_2$, $n^3P_0$ | | |
| Zn | $n^3P_2$, $n^3P_0$ | 4 | 9.39 |
| Cd | $n^3P_2$, $n^3P_0$ | 3.73 | 9.00 |
| Hg | $6^3P_2$ | 5.4 | 10.434 |
| | $6^3P_0$ | 4.642 | |
| He | $2'S_1$ | 20.55 | 24.581 |
| | $2^3S_1$ | 19.77 | |
| Ne | "$3P_2$" | 16.53 | 21.559 |
| A | "$3P_2$" | 11.49 | 15.75 |
| Kr | "$3P_2$" | 9.8 | 13.996 |
| Xe | "$3P_2$" | 8.30 | 12.127 |
| Rn | "$3P_2$" | | 10.746 |
| Tl | $6^2P_{3/2}$ | 0.97 | 6.1 |

Light Amplifier Action in a Helium Discharge

The lowest non-metastable level of He is so high ($2'P_1$ at 21.1 volts) compared to the spacing of the next higher level ($3's_o$ at 22.9 volts) and compared to the ionization potential (24.58 volts), that two unusual consequences are true.

Firstly, the decay rate $A(2'P_1 \rightarrow 1'S_o) \approx 10^{10}$/sec, while $A(3'S_\sigma \rightarrow 2'P_1) \approx 10^7$/sec, or 1,000 times slower.

Secondly, the electron temperature in a helium discharge is very high, of the order of 25,000° C. or $\sim 2.5$ electron volts average electrons energy at about 1 mm Hg discharge pressure, up to 200,000° C. at very low pressures ($10^{-2}$ mm Hg). The Maxwell distribution of kinetic energies in a perfect gas at thermal equilibrium is $$\frac{dn}{n} = 2\sqrt{\frac{E}{\pi}} \frac{e^{-E/KT}dE}{[KT]^{3/2}}$$

So the ratio of numbers of electrons having energies $E_h$ and $E_l$ is $$\frac{dn_h}{dn_l} = \sqrt{\frac{E_h}{E_l}} e^{-\frac{(E_h - E_l)}{KT}}$$

The ratio of excitation rates to the $3'S_o$ and $2'P_1$ levels by electron collisions will be roughly equal to $dn_2/dn_1$. Since $E(3'S_o) - E(2'P_1) = 1.7$ electron-volts and $KT \approx 2.5$ e.v., it will be seen that the rate of excitation by electrons is almost the same for both levels, while the rate of decay from $2'P_1$ to the ground level is almost 1,000 times greater. One may, therefore, expect an excess population in $3'S_o$ over that in $2'P$.

This does not take account of factors which will tend to raise the population of $2'P_1$:

Firstly, most of the atoms excited to higher levels must decay via the $2'P_1$ level.

Secondly, the photons emitted during the processes $2'P_1 \rightarrow 2'S_o$ $2'P_1 \rightarrow 1'S_o$ (ground)

will be trapped in the gas the re-excite atoms to $2'P_1$. However, it appears that in at least some instances a pure He discharge will be desirable for use in a light amplifier device according to the present invention. A similar trapped photon situation exists for the Na(7S→3P) transition.

Other Cases of Excitation by Collisions of the Second Kind

In addition to the selective excitation of Na(7S or 6P) by collision with metastable Hg($6^3P_o$) atoms in a discharge, there are listed in Table II other atomic metals which may be excited by collision with metastables. In each case higher levels of the working element fall near metastable levels of a possible carrier gas. In some cases such "sensitized fluorescence" has already been observed by experimentors. For a fuller understanding of Table II, refer to Table I.

It is obvious that light amplifiers in different frequency ranges will be desired for various different applications and thus this characteristic of the type of discharge utilized, as well as others of its characteristics in addition to its inherent efficiency, will be considered in selecting the medium utilized in a light amplifier.

TABLE II

| SOME COLLISIONS OF THE SECOND KIND | | | |
|---|---|---|---|
| CARRIER GAS | CARRIER METASTABLE LEVEL | INITIAL LEVEL OF WORKING ATOM | EXCITED LEVEL OF WORKING ATOM |
| Hg | $6^3P_0$(4.642 v) | Tl($6^3P_{3/2,1/2}$) | Several |
| Hg | $6^3P_0$(4.642 v) | In($5^2P_{3/2,1/2}$) | Several |
| Hg | $6^3P_0$(4.642 v) | Hg$6^3P_0 \rightarrow 8'S_0$ | (9.20 v) ($\Delta E$ = 0.08 v) ↓ |

TABLE II-continued

| SOME COLLISIONS OF THE SECOND KIND | | | |
|---|---|---|---|
| CARRIER GAS | CARRIER METASTABLE LEVEL | INITIAL LEVEL OF WORKING ATOM | EXCITED LEVEL OF WORKING ATOM |
| He | $2'S_0$(20.55 v) $2^3S_1$(19.77 v) | $6'P_1$ + 4916Å photon ↓ $6'S_0$ + 1899Å photon Ne($2'S_o$) | |
| A | $4^3P_2$(11.49) | Kr($4'S_0$) | |
| Kr | $5^3P_2$(9.84) | Hg($6'S_0$) Xe($5'S_0$) | $8'D, 8^3D$ |
| Xe | $6^3P_2$ | Hg | |

Light Amplifier Transitions from Metastable to Ground Level

In all the examples discussed so far, the spontaneous decay rate of the excited level was $>10^6$/sec, characteristic of "allowed" electric dipole radiative transitions. Since the excitation rate is of the order of $10^5$/sec even using the efficient and selective method of collisions of the second kind, it is evident that the excited level population could not be made greater than the ground level. Thus light amplifier action or emission by mutually-induced transitions could occur only to an intermediate level whose population was kept lower by an even faster rate of spontaneous decay.

It is also possible to depopulate a longer lived lower level by collisions of the second kind, to accomplish the same result.

This situation is in contrast to that of the MASER. For levels spaced only by $E = h\nu$ where $\nu$ is a microwave frequency, the thermal equilibrium population of the excited level is high and the lifetime is long. Therefore, the population of the excited level is easily maintained above that of the ground level.

In the case of levels high above ground (optical transitions), the initial populations will always be low. But if the levels are long-lived (metastable), it may be possible to populate them at a rate greater than the natural decay rate or relaxation rate, and hence to maintain a higher population of atoms in the higher state.

Many of the elements which exist as single atoms in the gaseous state do not have high vapor pressures at convenient temperatures. Therefore, those which may possess metastable states are not useful in exciting other atoms by collisions of the second kind. Nevertheless, it may be possible to use such atoms as working atoms as described above. For this purpose the pressure may be much lower. Most of these metastable levels are listed in Table I.

Figure 5:
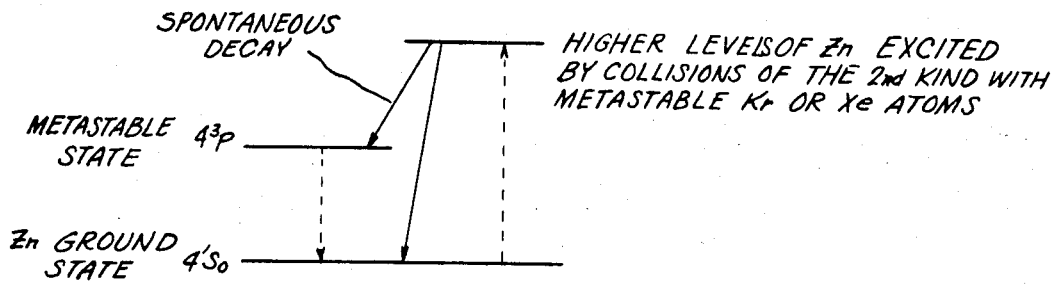
FIG. 5 is a diagram of some energy levels of zinc useful in describing a form of the invention utilizing an internal discharge for exciting the working medium.

As an example, consider the case of zinc. The metastable $4^3P$ levels lie about 4 electron-volts above ground as shown in FIG. 5. These levels do not lie close to any other metastable levels and so cannot be excited directly by collisions of the second kind. However, higher, non-metastable levels of Zn, can be excited by collisions with metastable krypton and zenon. From these levels the Zn atoms decay rapidly to the metastable levels as well as the ground level.

The rate of decay of Zn ($4^3P_1 \rightarrow 4'S_o$) by emission of the ultraviolet photon, $\lambda = 3076$ Å, is $A = 1 \times 10^5$/sec. It has already been mentioned that rates of collision excitation somewhat greater than this may be achievable.

Therefore, it should be possible to generate light amplifier transitions directly to the ground level with zinc. One must have $$N_{high} - N_{low} \approx N_{high} > \frac{\bar{a}\, 8\pi}{l^2 f(vo) A}$$

Substitution of values gives $N_{Zn(3P_1)} > 5 \times 10^{11}/cm^3$. If the atoms are shared by collision among the three metastable levels, the required zinc pressure is only $2 \times 10^{-5}$ mm Hg. which is the vapor pressure at about 200° C.

In the case of thallium, most of the atoms may be pumped into the much longer lived $6^2P_{3/2}$ metastable level by a similar indirect mechanism; either collisions of the second kind with Hg metastables or absorption of the 3776 Å resonance radiation with subsequent decay to $6^2P_{3/2}$.

In this case, since $$A(6^2P_{3/2} \rightarrow 6^2P_{\frac{1}{2}}) \approx 50/sec.,$$

the density must be quite high: $N \approx 10^{14}$ atoms/$cm^3$ or $P \approx 3 \times 10^{-3}$ mm Hg. at a temperature, T 600° C.

Resonant Light Amplifier for Generation of Transient Pulses

For particular applications it may be desired to operate resonant light amplifier apparatus to generate transient pulses of light energy. Such pulses will generally have the characteristics of the output of a resonant light oscillator, namely narrow frequency bandwidth, near planarity of wave shape, etc. In addition, the transient pulses will have their energy concentrated in a very short time. This time period may be shorter than $10^{-8}$ seconds. The length of the pulse may, of course, be longer and is subject to control, as is the shape of the pulse to some extent, all as will later be explained. The intensity of the pulse will be considerably higher than light intensity obtained with comparable apparatus in steady state operation. The light amplifiers of either the resonant or nonresonant type can, of course, be operated in pulse fashion simply by pulsing the source of exciting energy such as the light excitation or the electrical discharge excitation.

In the previously explained operation of light amplifier devices, the stimulated emission added coherently to the inducing radiation. Except for the refraction effects, a wave-train traveling through an activated light amplifier medium is linearly amplified as long as the density of excited atoms (or ions or molecules) remains substantially unchanged and provided the transition is not "power broadened". By means of operation outside the above limits, different effects are produced (e.g., non-linear amplification), and apparatus utilizing these effects has capabilities beyond those of the previously, discussed light amplifier devices.

Figure 6:
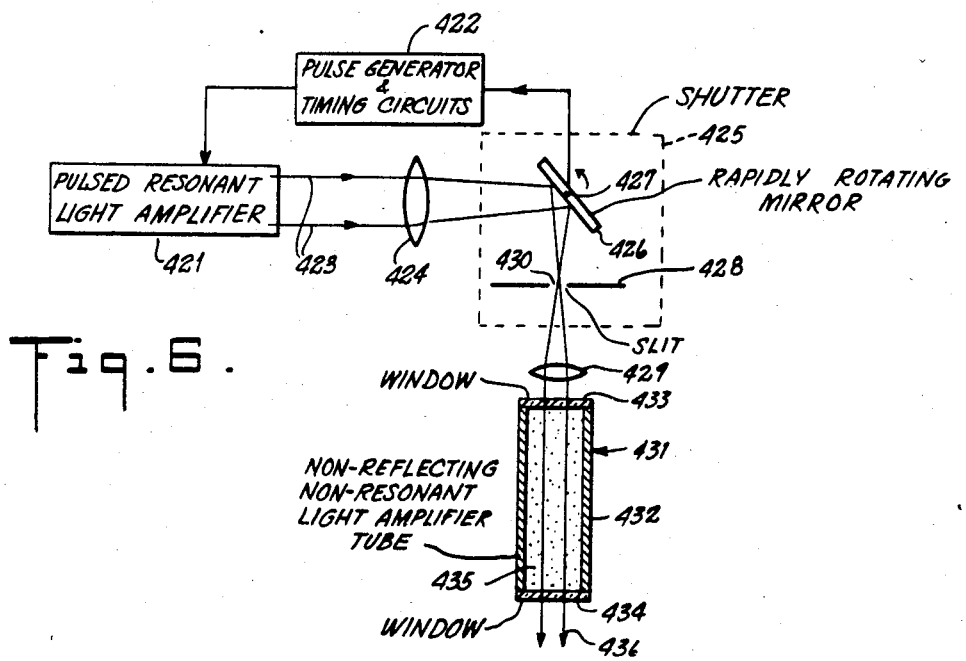
FIG. 6 is a partially schematic diagram of a system for generating short light pulses.

Apparatus for producing light pulses by the utilization of light amplification in a light amplifier with non-reflecting walls is shown in FIG. 6. A pulsed resonant light amplifier is indicated schematically at 421. This amplifier may be constructed in accordance with previously described principles, for example, in accordance with FIG. 15 of my patent No. 3,388,314 and the description thereof.

The pulsed resonant light amplifier 421 is controlled by a pulse generator and timing circuit 422.

The output from the pulsed resonant light amplifier 421 is in the form of light pulses indicated by arrows 423. These light pulses are directed as desired such as by the lens 424.

In order to take maximum advantage of the amplification effect in a non-reflecting, nonresonant light amplifier according to the present invention, it may be desired to provide the non-reflecting amplifier with a light pulse having as short a rise time as possible e.g. a sharply rising intensity with an intensity rise time of less than approximately $10^{-7}$ seconds. Otherwise, some of the energy stored in the non-reflecting amplifier will be expended in amplification of the low intensity leading portion of the input pulse.

Accordingly, a very high speed shutter arrangement is illustrated in FIG. 6 for obtaining a pulse output having a very short rise time. Whereas the rise time of the pulsed resonant light amplifier 421 may be on the order of $10^{-8}$ seconds, the shutter 425 may be constructed to have an output having a rise time on the order of $10^{-11}$ seconds.

A shutter 425 comprises a mirror 426 which is very rapidly rotated about an axis indicated at 427. An opaque member 428 is provided having a narrow slit 430. For the position of the mirror 426 shown in FIG. 6, the rays 423 from the pulsed resonant light amplifier 421 are focused on the slit 430 and accordingly pass through the opaque member 428. As the mirror 426 is rotated, the rays from the amplifier 421 are swept across the opaque member 428 and periodically, for a very short time interval, pass through the slit 430.

The width of the slit 430 is preferably that of the width of the Fraunhofer pattern for the light beam at that particular point. The width of the Fraunhofer pattern will be greater as the distance of the opaque member 428 from the mirror 426 is increased. This distance may be set at any convenient value and, if desired, the path of the light rays 423 may be folded by the use of mirrors or the like in order to make the shutter apparatus of manageable size. For example, if the opaque member 428 is placed 10 meters away, the width of the Fraunhofer pattern will be approximately 1/10th of 1 millimeter. The cutting of a slit of this width in the opaque material 428 presents no difficulties.

The mirror 426 is preferably rotated at a very high speed to obtain a pulse having a very short rise time from the shutter 425. If the velocity can be raised to $10^6$ radians per second, a pulse of approximately $10^{-11}$ seconds can be obtained. Known techniques for obtaining high rotational velocity can be utilized in the construction of the rapidly rotating mirror 426. For example, the mirror can comprise a ground "flat" on a small metal cylinder and can be placed in an evacuated enclosure and provided with a substantially frictionless suspension. If desired, magnetic suspension can be utilized. The mirror may be brought to a high rotational velocity by a rotating magnetic field.

It will be understood that the particular shutter arrangement described with reference to FIG. 6 is a preferred form which is capable of attaining a very short rise time for the output pulse from the shutter. The operation of the nonresonant non-reflecting light amplifier of FIG. 6 is not limited to use with such extremely high speed shutters. Thus, in many instances a slower and relatively simpler shutter such as a Kerr cell may be used to provide a light pulse to the non-reflecting amplifier tube. Furthermore, although a resonant light amplifier provides a desirable type of light source for pulsing the non-linear light amplifier tube, any other light source of appropriate frequency could be utilized if controlled to give appropriate short duration light pulses.

The light on the shutter 425 is directed as by means of a lens 429 into a non-reflecting light amplifier tube 431. The amplifier tube 431 comprises a closure 432 having an input window 433 and an output window 434. The interior 435 of the non-reflecting light amplifier tube is filled with a suitable working medium. When utilized in conjunction with a pulsed resonant light amplifier 421, the working medium of the non-reflecting light amplifier tube 431 will generally be the same as that of the pulsed resonant light amplifier 421. In any case, the working medium of the amplifier tube 431 will be such that it is stimulated by the exciting light introduced through the input window 433.

The output from the non-reflecting light amplifier tube 431 is projected out through the output window 434.

The nonresonant non-reflecting light amplifier apparatus of FIG. 6 operates as follows.

The operation of the pulsed resonant light amplifier 421 and of the shutter 425 have previously been explained. It should be noted that the shutter 425 should be synchronized with the pulse of the pulsed resonant light amplifier 421 so that the open condition of the shutter 425 occurs as nearly as possible to the maximum intensity of the light pulse from the pulsed resonant light amplifier 421. This function is accomplished by the pulse generator and timing circuits 422.

Light pulses from the shutter 425 pass through the lens 429 where they are collimated. The collimated light pulse passes into the non-reflecting light amplifier tube 431 through the input window 433. In FIG. 6 the excitation means for the non-reflecting light amplifier tube 431 is omitted for simplicity. It will be understood that the working medium in the interior 435 of the amplifier tube 431 will be excited so that there is an excess population of atoms, ions, or molecules in an upper one of two energy levels separated by the frequency of the stimulating light from the pulsed resonant light amplifier 421. The activation energy for the working medium in the light amplifier tube 431 may be provided by light energy introduced through the wall 432, by an internal discharge, or by any other means such as those described hereinbefore.

It will be noted that reflection means are not included within the light amplifier tube 431 as they were in previous light amplifiers explained hereinabove. Accordingly, light photons emitted within the light amplifier tube 431 are not normally reflected to retraverse the interior 435 of the light amplifier tube 431. Usually a photon emitted will thus traverse less than the length of the light amplifier tube before being transmitted to the exterior or absorbed.

Accordingly, there is little opportunity for regenerative action within the light amplifier tube, add a considerable excess population of atoms (or ions or molecules) in the upper two energy levels can be achieved and maintained without spontaneous regenerative oscillation in the light amplifier tube.

When this condition exists in the light amplifier tube 431, it is conditioned to act as an amplifier. Such a non-reflecting nonresonant light amplifier is capable of amplifying light with a frequency bandwidth smaller than the corresponding transition bandwidth of the atoms, ions, or molecules of the working medium, but larger than the resonance response bandwidth of a resonant light amplifier. Also, wave-trains with non-planar wave fronts may be coherently amplified. For example, a diverging spherical wave may be amplified without changing its shape. Such a wave would not be accepted by a resonant light amplifier with planar specular reflectors. Of course, a resonant light amplifier may be constructed with reflectors of other than plane shape for amplifying non-planar waves. However, the more flexible non-reflecting nonresonant amplifier is preferred for this purpose.

Although the light amplifier tube 431 would operate as a substantially linear amplifier for low intensity light inputs, it is of more interest to consider the operation of the apparatus for relatively high intensity input pulses. By relatively high intensity, it is meant that the pulse intensity is sufficient to substantially depopulate the higher energy level at a given point before the entire pulse wavetrain passes this point in the light amplifier tube. Under such conditions it will be apparent that while the first portion of the input wave-train of light will be amplified to a substantial extent, the trailing portion of the wave-train will not be amplified or will be only slightly amplified.

As the pulse passes through the light amplifier tube 431, this effect will be highly cumulative for as the intensity of the leading portion of the wave-train is built up it will tend to more completely and more rapidly depopulate the upper energy level in the volume through which it passes so that there will be effectively an exponential growth of the intensity of the leading portion of the pulse together with a generally corresponding shortening of the pulse due to the lack of amplification of the trailing portion of the pulse wave-train.

From the foregoing explanation, it will be seen that the non-reflecting light amplifier tube 431 produces a great intensification of the input pulse, together with a considerable shortening of the pulse length. The shortening of the pulse length which can be obtained is limited by the fact that the Fourier transform of a short pulse contains frequency components far removed from the nominal frequency. Thus, as the pulse becomes shorter and shorter, the energy in the pulse will cease to be concentrated at the nominal frequency; as a result the efficiency of the process will deteriorate, thus limiting the shortening of the pulse which can be obtained. Due to this effect and for other reasons, it is unlikely that a pulse length shorter than several hundred cycles of the light frequency can be obtained, no matter how long the non-reflecting amplifier tube is made.

It should be noted that the operation of the non-reflecting light amplifier tube comes somewhat more complex when the transition becomes "power broadened". These different effects are of consequence when the time required for the wave-train length to pass a given point is less than the phase relaxation time. The various effects produced under this condition will not be discussed in detail. It will suffice to say that under these conditions the pulse passing through the non-linear light amplifier tube will continue to grow shorter and denser. One minor effect is that the peaking action of the input wave form will be somewhat delayed so that the peak will be formed somewhat behind the leading edge of the input pulse wave-train.

Short light pulses such as those obtained from the pulsed resonant light amplifier and even shorter pulses obtainable from the non-reflecting light amplifier tube are useful for various purposes and in various systems, some of which will later be explained in some detail.

The apparatus of FIG. 6 by itself would be useful in the field of high speed photography. The length of pulse obtainable with apparatus as shown in FIG. 6 may be as short as the order of $10^{-12}$ seconds. The ability of a pulse of this short length to "stop" action can be appreciated by the fact that an object traveling at the speed of light would be stopped within one millimeter by such a short pulse of light.

Although the total amount of light energy may be somewhat smaller than conventional photographic light sources, this would not be a serious limitation, and particularly so in the field of microphotography, for example, where only a small area need be illuminated. The fact that the output from the non-linear light amplifier has very nearly plane waves makes it possible to focus the output to as small an area as would be desired for microphotographic purposes.

What is claimed is:

1. Light amplification apparatus including a bounded volume containing a substance, the atoms, ions or molecules of which have well defined energy states, including a pair of states which differ in energy by an amount corresponding to light frequencies; means for providing other particles within said bounded volume which have the proper energy so as to be susceptible of transferring said energy to said atoms, ions or molecules, upon collision, thereby producing a greater population of atoms, ions or molecules of said substance in the higher of said pair of states; and means for defining a light path through said bounded volume which enables a stimulating light beam to selectively stimulate emission of light in said bounded volume, said light thus emitted having the same direction, frequency phase and polarization as the stimulating light.

2. The light amplification apparatus as defined in claim 1 in which said other particles provided in said bounded volume are atoms, ions or molecules different than said substance, said other particles being excited to a long-lived state above the ground state.

3. The light amplification apparatus as defined in claim 2 in which said means for producing said excited particles includes means for producing an electric current in said bounded volume.

4. The light amplification apparatus as defined in claim 3 also including means for providing egress of light from said bounded volume.

5. The light amplification apparatus as defined in claim 1 in which said other particles provided in said bounded volume are electrons.

6. The light amplification apparatus as defined in claim 5 also including means for providing egress of light from said bounded volume.

7. The light amplification apparatus as defined in claim 1 in which said substance is a first noble gas and said other particles are a second noble gas.

8. The light amplification apparatus as defined in claim 1 also including means to enable said substance to emit said light, when stimulated by said stimulating light beam in a wave train that has a sharply rising intensity, with an intensity rise time of less than approximately $10^{-7}$ seconds.

9. A method of providing light by stimulated emission including the steps of:
   (a) providing a substance in a bounded volume, the atoms, ions, or molecules of which have well defined energy states, including a pair of states which differ in energy by an amount corresponding to light frequencies;
   (b) providing other particles within said bounded volume which have the proper energy so as to be susceptible of transferring energy to said atoms, ions or molecules, upon collision, thereby producing a greater population of atoms, ions or molecules of said substance in the higher of said pair of states; and
   (c) directing stimulating light along a path through said bounded volume which enables the stimulating light to selectively stimulate emission of light in said bounded volume, said light thus emitted having the same direction, frequency phase and polarization as the stimulating light.

10. The method as defined in claim 9 in which said other particles provided in said bounded volume are atoms, ions or molecules different than said substance, said method also including the step of:
    (d) exciting said other particles to a long-lived state above the ground state.

11. The method as defined in claim 10 in which said other particles are excited by an electric current.

12. The method as defined in claim 9 in which said other particles provided in said bounded volume are electrons.

13. The method as defined in claim 9 in which said substance is a first noble gas and said other particles are a second noble gas.

14. The light amplification apparatus as defined in claim 1 in which the transition between said pair of states is an electric dipole transition.

15. The light amplification apparatus as defined in claim 14 in which the spontaneous decay rate from the lower of said pair of states is greater than from the higher of said pair of states.

* * * * *

UNITED STATES PATENT AND TRADEMARK OFFICE
CERTIFICATE OF CORRECTION

PATENT NO. : 4,704,583
DATED : November 3, 1987
INVENTOR(S) : Gordon Gould

It is certified that error appears in the above-identified patent and that said Letters Patent is hereby corrected as shown below:

On title page under heading "Other Publications", line 7 "Movers" should read --Masers--.

Column 7, line 36, "introcution" should read --introduction--.

Column 8, line 66, "intereior" should read --interior--.

Column 13, line 23, "2'P" should read --2'$P_1$--.

Column 14, line 62, "zenon" should read --xenon--.

Signed and Sealed this

Sixth Day of September, 1988

Attest:

DONALD J. QUIGG

Attesting Officer     Commissioner of Patents and Trademarks